United States Patent [19]

Hastings et al.

[11] Patent Number: 5,600,234
[45] Date of Patent: Feb. 4, 1997

[54] SWITCH MODE POWER CONVERTER AND METHOD

[75] Inventors: Roy A. Hastings, Allen; Marco Corsi, Dallas; William C. Johnston, Garland, all of Tex.

[73] Assignee: Texas Instruments Incorporated, Dallas, Tex.

[21] Appl. No.: 396,856

[22] Filed: Mar. 1, 1995

[51] Int. Cl.[6] ........................................ G05F 1/56
[52] U.S. Cl. ............................ 323/282; 323/285
[58] Field of Search .................. 323/282, 283, 323/285, 286, 287; 330/9; 341/155, 172

[56] References Cited

U.S. PATENT DOCUMENTS

4,975,820  12/1990  Szepesi ........................... 363/21

*Primary Examiner*—Peter S. Wong
*Assistant Examiner*—Rajnikant B. Patel
*Attorney, Agent, or Firm*—Warren L. Franz; Wade James Brady, III; Richard L. Donaldson

[57] ABSTRACT

A switch mode power converter (10) is provided. Converter (10) includes a switching cell (12) that transforms an input voltage at input port (22) to an output voltage at output port (24). Switching cell (12) is controlled by a fixed-period, variable on-time control signal from summing comparator (14). The period of the control signal is set by a driving circuit (20). The on time is set by first and second feedback circuits (16) and (18). First feedback circuit (16) provides a fast transient response. Second feedback circuit (18) provides an stable dc steady-state operating point.

28 Claims, 2 Drawing Sheets

SWITCH MODE POWER CONVERTER AND METHOD

TECHNICAL FIELD OF THE INVENTION

This invention relates in general to the field of electronic devices. More particularly, this invention relates to a switch mode power converter and method.

BACKGROUND OF THE INVENTION

A switch mode power converter is a multi-port network having at least one input port and at least one output port. The power converter includes a switching cell, which transfers electrical energy from the input ports to the output ports. The switching cell includes at least one inductor, and may also include one or more capacitors. The switching cell includes at least one controlled switch, such as a power transistor, and possibly one or more diode rectifiers. The switching cell also has at least one control port that drives the switches by adjusting the switch conduction periods so as to regulate the flow of electrical power through the converter.

Commonly, a switch mode power converter is used as a voltage-regulated power supply. In such a power supply, the output voltage is held substantially constant irrespective of fluctuations in the output current and the input voltage. The quality of such a voltage-regulated power supply is measured by characteristics such as load regulation, line regulation, and transient response. The load regulation of a power supply represents the susceptibility of the dc voltage output of the power supply to fluctuations in load current. The line regulation of a power supply represents the susceptibility of the dc output voltage of the power supply to fluctuations in input voltage. The transient response represents the magnitude of the overshoot (or undershoot) and the settling time for the output of the power supply in response to a step change in line voltage or load current. It is desirable to have a voltage regulated power supply that has good load and line regulation and a fast transient response.

The behavior of voltage-regulated power supplies is dependent upon the current within the inductor of the switching cell, and two modes of operation are distinguished upon this basis. The first mode of operation is referred to as continuous mode. In continuous mode, the first derivative of the inductor current is continuous within each topological state of the circuit. The second mode of operation is referred to as discontinuous mode. In discontinuous mode of operation, the first derivative of the inductor current is discontinuous within one topological state of the circuit. This means that the current in the inductor drops to zero and remains at zero for some finite length of time. In each mode of operation, a particular voltage regulated power supply may have a distinct frequency response with independent compensation requirements.

Switching cells can be broadly divided into two categories: buck derived and boost derived cells. Buck derived cells include the buck, forward push-pull, half-bridge and full bridge topologies. Boost derived cells include the boost, inverting and fly-back topologies. In continuous mode, boost derived topologies exhibit a right half plane zero that greatly complicates stabilization.

Voltage regulated power supplies control the output of the switching cell with some form of negative feedback. Two prior common control schemes are referred to as voltage mode control and current mode control. Each is described in detail below. With voltage mode control, the output voltage of the power converter is sensed by a feedback circuit and is used to control the converter. The feedback circuit includes an error amplifier which compares the output voltage to a fixed reference voltage and generates an error signal. A modulator circuit transforms the error signal into a train of pulses which are fed to the control port of the switching cell. The output of the modulator circuit controls one or more switches in the switching cell so as to regulate the output voltage. In discontinuous mode, the voltage mode control strategy applied to a buck derived topology exhibits a single pole frequency response which typically does not require additional compensation. A small valued capacitor is often used to create a high frequency pole for noise suppression. But, this pole is positioned at a sufficiently high frequency to prevent it from significantly degrading the phase margin below the unity gain frequency. This provides good line and load regulation as well as reasonably fast transient response. However, in continuous mode, the appearance of a pair of poles in the transfer function representing the control loop requires a lead-lag network to provide adequate phase margin to ensure stability. Although this configuration provides good line and load regulation, it has a slow transient response due to the large time constant of the lead-lag network.

Other prior converters use a current mode control strategy which monitors an analog of inductor current as well as output voltage to provide a substantially regulated output voltage. One type of current mode control is referred to as peak-current-commanding control. This control scheme, like voltage mode control, uses an error amplifier which compares the output voltage to a fixed referenced voltage to generate an error signal. This error signal is used to set the peak current permitted to flow in the inductor. A second, or minor loop, measures the inductor current and feeds it back as a second input to a comparator. The comparator compares the peak current sensed in the inductor to the error signal generated by the error amplifier. The comparator controls the switch of the switching cell through an oscillator-controlled flip-flop, so that the switch will be disabled when the peak inductor current reaches the threshold set by the error signal. In continuous mode, this circuit exhibits a single pole response rather than the-two pole response characteristic of voltage mode control. The single pole response characteristic of this circuit simplifies the compensation of the converter. Peak current commanding current mode control also simplifies implementation of current limiting for protection of the power devices contained in the switching circuit. Additionally, the minor loop provides feedforward correction of line voltage variations by responding immediately to any change in line voltage. This provides superior transient response to line voltage fluctuations. However, current mode control also exhibits several difficulties. First, current mode control exhibits open-loop instabilities (sub-harmonic oscillations) where the duty cycle of the switch exceeds fifty percent. Additionally, it is difficult to properly sense the current in the inductor without either employing costly current transformers or risking significant noise pick-up from small valued current sense resistors.

Another prior scheme for controlling a switch mode power converter is referred to as direct-summing current mode control. In this configuration, the error amplifier is replaced with a direct feedback to one input port of a summing comparator. The summing comparator has two pairs of differential inputs. The output of the comparator switches when the sum of the differential voltages across the input ports is equal to zero. The first differential input is connected so as to receive the difference between the output voltage and a fixed reference voltage. The inductor current is sensed differentially across a small resistor and is fed back to the second differential input to the summing comparator. Without the error amplifier, the gain of the circuit is substantially reduced. If the magnitude of the current sense signal is kept small, the circuit gain can be increased to practical levels without the use of an error amplifier. Eliminating the error amplifier eliminates the excess phase shift associated with this component, somewhat simplifying compensation. The circuit is also less complex and the current consumption associated with the error amplifier is eliminated. Direct summing current mode control has inherently poor load regulation because the gain of the loop is limited by how small the current sense voltage can be made. If this voltage is too small, the circuit will be unduly noise sensitive.

SUMMARY OF THE INVENTION

In accordance with the present invention a switch mode power converter and method is provided that substantially reduces or eliminates disadvantages and problems associated with previously developed power converters and methods. More particularly, the present invention includes in one embodiment a switch mode power converter having first and second feedback circuits. The power converter includes a switching circuit with at least one input port, one output port and one control port. The switching circuit transfers electrical energy from the input port to the output port. The power converter also includes a summing comparator with three differential input ports and an output terminal. The output of the summing comparator will switch when the sum of the differential voltages across the input ports is equal to zero. The output terminal is coupled to a control port of the switching circuit. First and second feedback circuits are coupled between an output port of the switching circuit and two of the differential input ports of the summing comparator. A reference voltage supplies the second terminal to each differential input port. Finally, a driving circuit is coupled to the third differential input pair of the summing comparator to establish a base-line period for the control signal. In a switch mode power converter constructed according to the teachings of the present invention, the first feedback loop provides a fast transient response for the power converter and the second feedback loop provides superior load regulation characteristics for the output of the circuit.

According to another aspect of the present invention, the driving circuit comprises an oscillator for outputting a predetermined, periodic waveform comprising, for example, a sawtooth waveform. The peak-to-peak voltage output by the oscillator may be controlled by a voltage supplied to the input port of the switching circuit. Therefore, the driving circuit provides feedforward correction of line voltage variations.

A technical advantage of the present invention is that in one embodiment it provides a switch mode power converter that uses two separate control loops and a summing comparator to produce a stable, regulated output with fast transient response and an accurate dc operating point. The first control loop feeds the output of the converter back to a summing comparator through a simple R-C network with a high frequency pole. Therefore, the first control loop exhibits essentially a single pole response. Thus, the power converter has a fast transient response. The second control loop uses a high gain error amplifier that maintains the output of the power converter at an accurate dc level. The converter thus provides fast transient response and is substantially resistant to line or load fluctuations.

Another technical advantage of the present invention is that in one embodiment it provides for feedforward control without requiring a complex and difficult current sensing scheme. Rather, the system merely uses the input voltage to the switching circuit to control the magnitude of the waveform output by the driving circuit. Thus the switching cell may react more quickly to changes in line voltage.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF THE INVENTION

Figure 1:
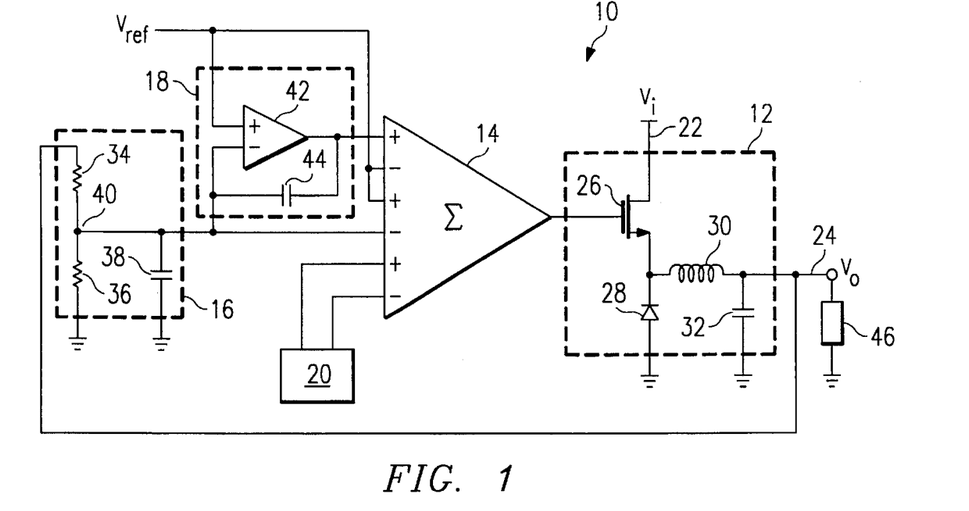
FIG. 1 illustrates one embodiment of a switch mode power converter constructed according to the teachings of the present invention.

FIG. 1 illustrates an embodiment of a voltage mode control switch mode power converter indicated generally at 10 and constructed according to the teachings of the present invention. Converter 10 uses two feedback loops in combination to provide an accurate dc steady-state output voltage that has a fast transient response. Converter 10 comprises a switching cell 12, a summing comparator 14, a first feedback circuit 16, a second feedback circuit 18 and a driving circuit 20.

Switching circuit 12 transfers electrical energy from an input port 22 to an output port 24. In the embodiment of FIG. 1, switching cell 12 transfers an input or line voltage, $V_i$, at input port 22 to a lower voltage, $V_o$, at output port 24. As shown, switching cell 12 is a standard buck circuit. Switching cell 12 may also be referred to as a step down circuit or a chopper circuit. It is noted that switching cell 12 of converter 10 may be replaced with any of the conventional buck-derived switching cells such as the forward, push-pull, half-bridge, full-bridge or similar topologies. Additionally, converter 10 is shown with a single input and a single output. The teachings of the present invention are not so limited but are applicable to other converters with multiple inputs and multiple outputs.

Switching cell 12 comprises an N-channel MOS transistor 26, a diode 28, an inductor 30, and a capacitor 32. The drain of transistor 26 comprises input port 22. The gate of transistor 26 comprises a control port for switching cell 12 and is coupled to an output of summing comparator 14. A cathode of diode 28 is coupled to the source of transistor 26 and an anode of diode 28 is coupled to a ground potential. Inductor 30 is coupled between the source of transistor 26 and output port 24 of switching cell 12. Additionally, capacitor 32 is coupled between output port 24 and a ground potential.

First feedback circuit 16 is coupled between output port 24 and summing comparator 14 to provide a first control loop. As described in detail below, first feedback circuit 16 ensures a fast transient response for converter 10. First feedback circuit 16 comprises first and second resistors 34 and 36, and capacitor 38. Resistor 34 is coupled between output port 24 and a node 40. Resistor 36 and capacitor 38 are coupled between node 40 and a ground potential. Node 40 is coupled to a negative input terminal of a differential pair of inputs of summing comparator 14. A reference voltage part, $V_{ref}$, is coupled to the corresponding positive input terminal of the differential pair.

Second feedback circuit 18 is coupled between node 40 and summing comparator. 14 to provide a second control loop. As described in detail below, second feedback circuit 18 ensures an accurate dc operating point for converter 10. Second feedback circuit 18 Comprises an amplifier 42 and a capacitor 44. Amplifier 42 has a large dc voltage gain compared to the gain of first feedback circuit 16. A negative input of amplifier 42 is coupled to node 40. The positive input terminal of amplifier 42 is coupled to $V_{ref}$. Additionally, capacitor 44 is coupled in a Miller-configuration between the negative input of amplifier 42 and the output of amplifier 42. The output of amplifier 42 is also coupled to a positive input of a second differential pair input of summing comparator 14. $V_{ref}$ is coupled to the corresponding negative input of the differential pair.

Driving circuit 20 is coupled to a third differential input pair of summing comparator 14 to establish a fixed-period, variable on-time method of control as described below. Driving circuit 20 comprises an oscillator that produces on output waveform that fixes the period of the control signal produced by summing comparator 14. For example, the output of driving circuit 20 may comprise a sawtooth ramp signal or any other appropriate signal for establishing a base-line period for controlling transistor 26.

Summing comparator 14 generates a control signal for switching cell 12 as described in detail below. Essentially, summing comparator 14 creates a weighted sum of the voltages applied to each positive input, a weighted sum of the voltages applied to each negative input, and compares these two weighted sums to produce an output waveform. When the weighted sum of the voltages applied to the positive inputs is greater than the weighted sum of the voltages applied to the negative inputs, the output of summing comparator 14 goes high. Otherwise, the output of summing comparator 14 remains low. Driver circuit 20 generates a periodic waveform that establishes the period of the control signal from summing comparator 14. The other two differential inputs control the trip point that causes summing comparator 14 to switch from on to off. First and second feedback circuits 16 and 18 establish the on-time for switch 26 to maintain a regulated output voltage at output port 24.

In operation, converter 10 of FIG. 1 provides a regulated stepped-down voltage at output port 24 that has a fast transient response and a stable dc operating point. Additionally, converter 10 is substantially immune to fluctuations in load current or line voltage.

Summing comparator 14 provides a control signal to a gate of transistor 26 of switching cell 12. The control signal causes switching cell 12 to operate in one of two modes. First, summing comparator 14 turns on transistor 26 with a high output voltage. In this mode, transistor 26 conducts substantial current from its drain to its source. Second, summing comparator 14 turns transistor 26 off with a low output voltage. In this mode, transistor 26 ceases to conduct substantial current from its drain to its source.

When transistor 26 is turned on, the voltage at the source of transistor 26 increases approximately to the input voltage and produces a positive voltage across inductor 32 from the source of transistor 26 to output port 24. Thus, the current in inductor 32 increases. When summing comparator 14 turns transistor 26 off, diode 28 conducts and the source of transistor 26 is reduced to a voltage level that is approximately one diode drop below ground potential. This switches the polarity of the voltage on inductor 30. The first derivative of the current in inductor 30 becomes negative, and the current thus decreases. Capacitor 32 in combination with inductor 30 forms an LC filter which removes most of the transient voltage variation at node 24 providing a substantially dc output voltage to an attached load 46. Essentially, the switching on and off of transistor 26 causes capacitor 32 to maintain a substantially constant output voltage at output port 24, by averaging the power delivered by inductor 30 over a period of the control signal from summing comparator 14.

Converter 10 uses two control loops to maintain a substantially constant dc steady-state output voltage at output port 24. The first control loop of converter 10 feeds the output voltage from output port 24 to summing comparator 14 through the first feedback circuit 16. First feedback circuit 16 has a fast time constant and thus allows a quick transient response to changes in the output voltage. Capacitor 38 is intended solely as a noise suppression component. Thus, capacitor 38 is sized such that the pole it introduces does not interfere with the low frequency dynamics of converter 10. In order to ensure stability of converter 10 in continuous mode operation, the zero associated with the equivalent series resistance (ESR) of capacitor 32 is positioned so as to negate the phase shift introduced by one of the pair of poles created by the interaction of inductor 30 and capacitor 32. In this way, the transfer function of switching cell 12 can be simplified to approximate a single pole response. Since the gain about the first control loop is low, it will pass through unity before parasitics introduce sufficient phase shift to cause instability. This allows the use of essentially uncompensated feedback circuit 16 to provide fast transient response.

The second control loop feeds the output voltage through an error amplifier 42 to summing comparator 14. The large voltage gain of error amplifier 42 causes the second control loop to produce a very accurate operating point for the output voltage. Second feedback circuit 18 also has a relatively low unity gain bandwidth since it is intended to control only the steady-state output voltage of converter 10 and not the transient response. Capacitor 44 provides a low frequency dominant pole to stabilize the second control loop. The dominant pole ensures this feedback loop will be unconditionally stable, and ensures that the bandwidth of the second control loop will be substantially less than the first control loop.

The entire system response of converter 10 is the sum of the responses of the first and second feedback circuits 16 and 18. If for example, a step change in load current occurs, then first feedback circuit 16 will rapidly respond and will cause converter 10 to rapidly approach the desired operating point, thus limiting transient overshoot. Second feedback circuit 18 will respond more slowly. However, the voltage gain of second feedback circuit 18 will allow it to override first feedback circuit 16 and slowly cause the operating point of converter 10 to approach the state needed to provide the exact, expected output voltage at output port 24. Converter 10 thus responds quickly to transients and then more slowly settles to the exact output voltage required giving converter 10 superior line and load regulation characteristics as well as fast transient response.

Summing comparator 14 creates a control signal for switching cell 12 having a fixed period and a variable on-time. Summing comparator 14 receives inputs from first feedback circuit 16, second feedback circuit 18, and driving circuit 20. Driving circuit 20 sets the period of the control signal by providing, for example, a sawtooth waveform to summing comparator 14. Alternatively, driving circuit 20 could provide a triangle waveform or any other appropriate waveform to establish a fixed period and allow control of on-time for the output voltage waveform of summing comparator 14. The inputs from first and second feedback circuits 16 and 18 establish a trip point at which the output of summing comparator 14 switches. For example, summing comparator 14 may need to produce an output control signal having a fifty percent duty cycle to provide the desired output voltage at output port 24. If the peak-to-peak voltage provided by driving circuit 20 is 50 millivolts, the trip point for summing comparator 14 is approximately 25 millivolts. This means that the output of summing comparator 14 changes when the difference of the weighted sums of the positive and negative terminals corresponding to first and second feedback circuits 16 and 18 are equal to 25 millivolts. As the sawtooth ramp provided by driving circuit 20 increases from its minimum value, the output of summing comparator 14 initially outputs a high control signal to switching cell 12. Once the ramp reaches 25 millivolts, summing comparator 14 trips and outputs a low control signal to switching cell 12. If the output at output port 24 falls below the required level, first and second feedback circuits 16 and 18 cause the trip point for summing comparator 14 to increase. Therefore, the output of summing comparator 14 stays at a high voltage level longer. In this manner, first and second feedback circuit 16 and 18 provide a variable on-time for the output of summing comparator 14.

The speeds at which first and second feedback circuits 16 and 18 operate also effect the manner in which summing comparator 14 controls switching cell 12. First, first feedback circuit 16 operates at a higher speed than second feedback circuit 18. Thus, first feedback circuit 16 will establish a voltage drop across its differential input to summing comparator 14 that establishes a proper duty cycle for switching cell 12. Unfortunately, this introduces a slight droop in the output at output port 24. As time progresses, second feedback circuit 18 causes an appropriate voltage difference at its input port to summing comparator 14 to correct for this droop in output voltage. As the second control loop gradually increases its control voltage to summing comparator 14, the first control loop decreases it control voltage. Thus, the initial response of converter 10 to a transient is almost entirely determined by the first control loop. Once sufficient time is past, the first control loop will have decreased its control contribution to almost zero and the second control loop will determine the operating point of converter 10. The large gain and slow response of second feedback circuit 18 allows the second control loop to ultimately control the duty cycle to establish a proper dc steady state operating point.

Figure 2:
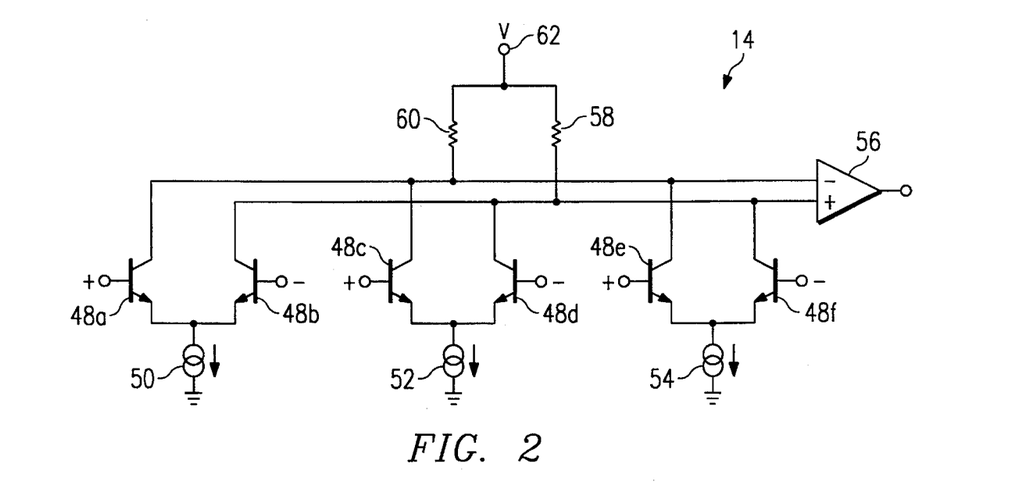
FIG. 2 illustrates one embodiment of a summing comparator constructed according to the teachings of the present invention.

FIG. 2 illustrates a summing comparator indicated generally at 14 and constructed according to the teachings of the present invention for use with converter 10 of FIG. 1. Summing comparator 14 comprises six transistors 48a through 48f. Transistors 48a through 48f are coupled to form three differential pairs of matched devices: 48a–48b, 48c–48d, and 48e–48f. An emitter of transistor 48a is coupled to an emitter of transistor 48b. A current source 50 is coupled between the emitters of transistors 48a and 48b and a ground potential. The bases of transistors 48a and 48b provide a differential input port for summing comparator 14. Similarly, transistors 48c and 48d are coupled in combination with current source 52 to provide a second pair of differential inputs at the base of transistors 48c and 48d for summing comparator 14. Finally, transistors 48e and 48f are coupled in a similar manner with current source 54 to provide a third differential input port for summing comparator 14.

Summing comparator 14 further comprises a conventional voltage comparator 56 and first and second matched resistors 58 and 60. Resistor 60 is coupled between a voltage supply 62, a collector of transistors 48a, 48c, and 48e, and a negative terminal to comparator 56. Additionally, resistor 58 is coupled between voltage supply 62 and a collector of transistors 48b, 48d, and 48f, and a positive terminal of comparator 56.

In operation, summing comparator 14 superimposes the differential output created by each pair of transistors 48a–48b, 48c–48d, and 48e–48f to provide a differential, weighted sum to comparator 56. If the emitter areas of transistors 48a through 48f are equal, each pair of differential inputs has an equal weight. If one differential pair of transistors has a larger or smaller emitter area, then the contribution of the corresponding inputs to the weighted sum will be proportionally larger or smaller. Comparator 56 thus produces an output voltage waveform to control switch 26. It is noted that transistor pairs 48a–48b, 48c–48d, and 48e–48f have a relatively small linear region of operation. However, in this application, summing comparator 14 does not require a large voltage swing to be applied to any of the input differential pairs. Therefore, the differential pairs 48a–48b, 48c–48d, and 48e–48f operate in a substantially linear manner to provide the appropriate differential, weighted sums to comparator 56.

Figure 3:
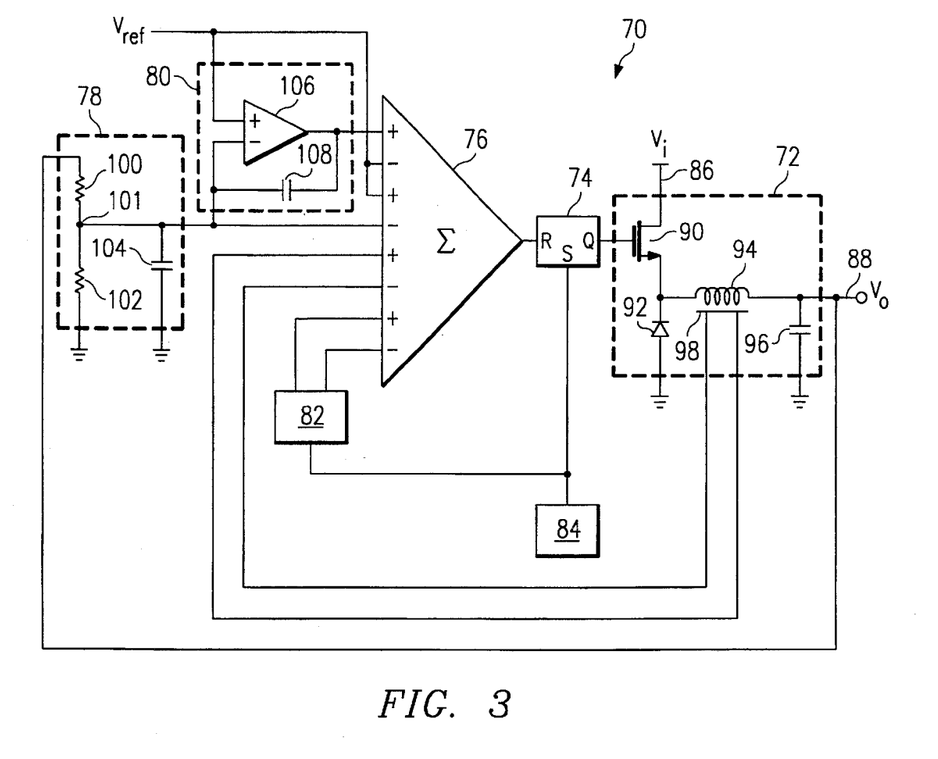
FIG. 3 illustrates another embodiment of a switch mode power converter constructed according to the teachings of the present invention.

FIG. 3 illustrates an embodiment of a current mode control switch mode power converter indicated generally at 70 and constructed according to the teachings of the present invention. Converter 70 uses three control loops in combination to provide an accurate dc steady-state output voltage that has a fast transient response. Converter 70 comprises a switching cell 72, a flip-flop 74, a summing comparator 76, first feedback circuit 78, second feedback circuit 80, a ramp generator 82, and an oscillator 84.

Switching circuit 72 transfers electrical energy from an input port 86 to an output port 88 similarly to switching circuit 12 of FIG. 1. As with switching cell 12, switching cell 72 may be replaced with any of the conventional buck-derived switching cells.

Switching cell 72 comprises an N-channel MOS transistor 90, a diode 92, an inductor 94, and a capacitor 96. These elements are coupled in the same manner as described above with respect to switching cell 12. Switching cell 72 further comprises a current sensing element 98. For example, current sensing element 98 may comprise a small resistor in series with inductor 94.

First feedback circuit 78 is coupled between output port 88 and summing comparator 76 to provide a first control loop. First feedback circuit 78 comprises first and second resistors 100 and 102, and capacitor 104. These elements are coupled in the same configuration as the elements of first feedback circuit 16 of FIG. 1. As described in detail with respect to first feedback circuit 16 of FIG. 1, first feedback circuit 78 ensures a fast transient response for converter 70.

Second feedback circuit 80 is coupled between node 101 and summing comparator 76 to provide a second control loop. The second feedback circuit 80 comprises an amplifier 106 and a capacitor 108. Amplifier 106 has a large dc voltage gain compared to the gain of first feedback circuit 78. Amplifier 106 and capacitor 108 are coupled in the same manner as the components of second feedback circuit 18 of FIG. 1. As described in detail with respect to second feedback circuit 18 of FIG. 1, second feedback circuit 80 ensures an accurate dc operating point for converter 70.

Ramp generating circuit 82 provides slope compensation to prevent subharmonic oscillations. Ignoring the function of ramp generator 82, the functioning of summing comparator 76 can be understood as follows. The differential inputs provided by the first and second feedback circuits 78 and 80 are summed together within summing comparator 76 to set the peak current level which is to flow through inductor 94. Periodically, oscillator 84 sets flip flop 74 turning on transistor 90 and causing the current in inductor 94 to ramp upwards. When the current in inductor 94 exceeds the peak current level set by feedback circuits 78 and 80, the current sense inputs to summing comparator 76 outweigh the other inputs. The output of summing comparator 76 thus goes high and causes flip flop 74 to be reset. This turns off transistor 90.

Summing comparator 76 performs the same function as summing comparator 14 described above. Therefore, summing comparator 76 may be constructed in a similar manner to summing comparator 14 of FIG. 2 with an additional pair of transistors coupled in a differential pair to receive a fourth set of inputs.

The final feedback loop in converter 70 comprises a current sensing loop. The output of current sense element 98 is coupled to provide a differential input to summing comparator 76. This configuration provides the minor loop necessary to implement peak current commanding current mode control. Current sense element 98 senses the current in inductor 94 and provides a proportional voltage to the input terminals of summing comparator 76.

In operation, converter 70 of FIG. 3 provides a regulated, stepped down voltage at output port 88 that has a fast transient response and a stable dc operating point. Additionally, converter 70 is substantially immune to fluctuations in load current or line voltage.

Converter 70 uses three control loops to maintain a substantially constant dc steady-state output voltage at output port 88. The first control loop of converter 70 feeds the output voltage from output port 88 to summing comparator 76 through the first feedback circuit 78. First feedback circuit 78 has a fast time constant and does allow quick transient response to changes in the output voltage. Capacitor 104 is intended solely as a noise suppression component. Thus, capacitor 104 is sized such that the pole it introduces does not interfere with the low frequency dynamics of converter 70. Due to the existence of the current sense loop and assuming capacitor 96 has a low ESR, the transfer function associated with switching cell 72 is essentially a single pole response. Since the gain about the first control loop is low, the gain of converter 70 will pass through unity before parasitics produce sufficient phase shift causing instability. This allows the use of essentially uncompensated feedback circuit 78 to provide a fast transient response. If capacitor 96 has a substantial ESR, the zero so introduced can be cancelled by suitably sizing capacitor 104 to provide a compensating pole.

The second control loop feeds the output voltage through an error amplifier 106 to summing comparator 76. The larger voltage gain of error amplifier 106 causes the second control loop to produce a very accurate operating point for the output voltage. Second feedback circuit 80 also has a relatively low unity gain bandwidth since it is intended to control only the steady-state output voltage of converter 70 and not the transient response. Capacitor 108 provides a low frequency dominant pole to stabilize the second control loop. The dominant pole ensures this feedback loop will be unconditionally stable and ensures that the bandwidth of the second control loop will be substantially less than the bandwidth of the first control loop.

Finally, current sense element 98 provides a final control loop for converter 70. As described above, current sense element 98 provides the minor loop required to implement peak current commanding current mode control. This mode of control simplifies the transfer function of converter 70, provides inherent feedforward correction of the input voltage, and provides pulse by pulse current limiting.

The entire system response of converter 10 is the sum of the responses of first and second feedback circuits 78 and 80; the loop including current sense element 98 normally being considered part of the modulator function. If for example, a step change in load current occurs, then first feedback circuit 78 will rapidly respond and cause converter 70 to rapidly approach the desired operating point, thus limiting transient overshoot. The second feedback circuit 80 will respond more slowly. However, the voltage gain of second feedback circuit 80 will allow it to override first feedback circuit 78 and slowly cause the operating point of converter 70 to approach the state needed to provide the exact, expected output voltage at output port 88. Converter 70 thus responds quickly to transients and then more slowly settles to the exact output voltage required giving converter 70 superior line and load regulation characteristics as well as fast transient response.

Although the present invention has been described in detail, it should be understood that various changes, substitutions and alternations can be made hereto without departing from the spirit and scope of the invention as defined by the appended claims. For example, transistor 26 of switching cell 12 and transistor 90 of switching cell 72 may be replaced with bipolar junction transistors, or any other appropriate semiconductor switching element. Similarly, diode 28 of switching cell 12 and diode 92 of switching cell 72 may be replaced with any appropriate synchronous rectifier circuit. Capacitor 44 and capacitor 108 may be similarly replaced with networks of passive components to provide additional flexibility in compensating converters 10 and 70, respectively. Summing comparators 14 and 76 may also be replaced with circuits that are functionally similar to, but simpler than, summing comparator 14 of FIG. 2.

By use of a different buck derived switching cell 12, the same technical advantages can be obtained within a converter 10 which steps up the input voltage or inverts the polarity of the input voltage. Similar modifications can be made to converter 70. Additionally, some buck derived topologies can provide isolation and multiple outputs while retaining the advantages of this invention. In the case of the multiple output topology, it is expected that the teachings of the present invention would be used to provide regulation of a primary output. In the event that cross regulation does not provide sufficient regulation of the secondary outputs, some form of post regulation would be employed; for example, a low drop out linear regulator or a magnetic amplifier.

The teachings of the present invention may further be applied to a boost derived switching cell 12 or 72 so long as it operates in discontinuous mode so as to ensure stability about the loop formed by the first feedback circuit 16 or 78 without the introduction of low frequency poles or zeros.

The teachings of the present invention may be further applied to forms of current mode control other than the type shown in FIG. 3. Such a current mode control scheme would include a summing comparator within the control circuitry that receives feedback from the output of the converter through two independent control loops. The first loop controls transient response and the second loop controls the dc steady state operating point.

What is claimed is:

1. A switch mode power converter, comprising:

a switching circuit having at least one input port, at least one output port, and at least one control port, said switching circuit for transferring electrical energy from said input port to said output port, under control of a signal applied at said control port;

a summing comparator having first, second and third differential input pairs and an output terminal, said output terminal coupled to provide said control signal to said control port of said switching circuit;

a reference voltage port for providing a reference voltage to a terminal of each of said first and second differential input pairs;

a first feedback circuit coupled between said output port and a terminal of said second differential input pair for providing a first control loop with said summing comparator and said switching circuit to control the transient response of the converter;

a second feedback circuit coupled between said reference voltage port, said first feedback circuit and a terminal of said first differential input pair for providing a second control loop with said summing comparator and said switching circuit to control the dc steady state operating point of the output port; and a driving circuit coupled to said third differential input pair of said summing comparator for establishing a base-line period for said control signal.

2. The converter of claim 1, wherein said driving circuit comprises an oscillator for outputting a predetermined, periodic waveform.

3. The converter of claim 1, wherein said driving circuit comprises an oscillator for generating a sawtooth ramp waveform of voltage with a fixed period.

4. The converter of claim 1, wherein said driving circuit comprises an oscillator for outputting a predetermined, periodic waveform, the peak-to-peak voltage output by said oscillator controlled by a voltage supplied to the input port of the switching circuit so as to provide feedforward correction of variations in the input voltage of the converter.

5. The converter of claim 1, wherein said first feedback circuit comprises:

a first resistor coupled between said output port of said summing circuit and a negative terminal of said second differential input pair of said summing comparator;

a second resistor coupled between said negative terminal of said second differential input pair and a ground potential, such that said first and second resistors form a resistor voltage divider; and a noise-filter capacitor coupled between said negative terminal of said second differential input pair and said ground potential, said capacitor chosen so as to not interfere with the low frequency dynamics of the converter.

6. The converter of claim 1, wherein said first feedback circuit has an output node; and wherein said second feedback circuit comprises:

an error amplifier with a predetermined voltage gain; said error amplifier having a positive input terminal coupled to said reference voltage port and a negative terminal of said first differential input pair of said summing comparator, a negative input terminal coupled to said output node of said first feedback circuit, and an output terminal coupled to a positive terminal of said first differential input pair of said summing comparator; and a capacitor coupled between said negative input terminal of said error amplifier and said positive terminal of said first differential input pair; said capacitor chosen to establish a dominant low frequency pole so as to stabilize said second control loop and so as to provide a unity gain frequency for said second control loop substantially below that of said first control loop.

7. The converter of claim 1, wherein said switching circuit has a transfer function that is substantially equivalent to a buck switching circuit.

8. The converter of claim 1, wherein said switching circuit comprises a single input and a single output.

9. The converter of claim 1, wherein said switching circuit comprises multiple inputs and multiple outputs.

10. The converter of claim 1, wherein said switching circuit comprises:

a switch having a first terminal coupled to the output terminal of the summing comparator, a second terminal coupled to said input port for receiving an input voltage, and a third terminal;

an inductive element coupled between said switch third terminal and the output port of said switching circuit, for storing energy;

a capacitive element coupled between said output port and a ground potential to maintain a predetermined output voltage at said output port; and a catch diode having a cathode coupled to said switch third terminal and said inductive element and an anode coupled to said ground potential.

11. The converter of claim 1, wherein said switch comprises an N-MOS transistor having a gate as said first terminal, a drain as said second terminal and a source as said third terminal.

12. The converter of claim 1, further comprising:

a current sense element coupled to sense a current in said switching circuit and create a voltage proportional to said sensed current, said sense element further coupled to a fourth differential input pair of said summing comparator;

a flip-flop coupled between said summing comparator output terminal and said switching circuit control port; and an oscillator coupled to control said driving circuit and said flip-flop so as to provide current mode control.

13. A method for controlling a switch mode power converter, comprising the steps of:

transferring electrical energy in a switching circuit from an input port to an output port, under control of a signal applied to a control port coupled to an output of a summing comparator;

feeding the voltage value of the output port back through a first control loop comprising the switching circuit, a first feedback circuit, and the summing comparator to control the transient response of the switching circuit;

feeding the voltage value of the output port back through a second control loop comprising the switching circuit, a second feedback circuit, the first control loop and the summing comparator to control the dc steady state operating point of the output port;

establishing a base-line period for the control signal with a driving circuit coupled to the summing comparator; and summing and comparing the outputs of the first feedback circuit, the second feedback circuit, and the driving circuit by said summing comparator to produce said control signal to control the operation of the switching circuit to provide a substantially constant output at the output port.

14. The method of claim 13, wherein said step of transferring electrical energy comprises the step of transferring electrical energy with a buck-derived switching circuit.

15. The method of claim 13, wherein said step of establishing a base-line period comprises the step of establishing a base-line period with an oscillator circuit coupled to a differential input of the summing comparator.

16. The method of claim 13, wherein said step of establishing a base-line period comprises the step of establishing a base-line period with an oscillator for establishing a sawtooth ramp voltage waveform.

17. The method of claim 13, further comprising the step of providing feedforward correction of the input voltage variation by using an oscillator for the driving circuit, wherein a peak-to-peak voltage of the oscillator has a predetermined ratio to the input voltage of the switching circuit.

18. The method of claim 13, wherein said step of feeding the voltage value of the output port back through a first control loop comprises the step of feeding the output voltage value back to the summing comparator through a control loop comprising a resistor voltage divider and a filter capacitor, wherein the capacitor is chosen not to interfere with the low frequency dynamics of the converter.

19. The method of claim 13, wherein said step of feeding the voltage value of the output port back through a second control loop comprises the step of feeding the voltage value of the output port back to the summing comparator through said first control loop and through an error amplifier with a capacitor chosen to establish a dominant low frequency pole so as to stabilize said second control loop.

20. A voltage regulated power supply, comprising:

a buck-derived switching cell having a switch with a control port and an input port, an inductor coupled to said switch and providing an output port of said switching cell, and a capacitor coupled between said output port and a ground potential to maintain a predetermined output voltage at said output port;

a summing comparator having first, second and third differential input pairs and an output terminal, said output terminal coupled to provide a control signal to said control port of said switching cell;

a reference voltage port for providing a reference voltage to a terminal of each of said first and second differential input pairs;

a first feedback circuit having a dc voltage gain, and coupled between said output port and a terminal of said second differential input pair for providing a first control loop with said summing comparator and said switching cell to control the transient response of the power supply;

a second feedback circuit having a large dc voltage gain compared to the dc voltage gain of the first feedback circuit, said second feedback circuit coupled between said reference voltage port, said first feedback circuit and said first differential input pair for providing a second control loop with said summing comparator and said switching cell to control the operating point of the output port; and a driving circuit coupled to said third differential input pair of said summing comparator for establishing a base-line period for said control signal.

21. The power supply of claim 20, wherein said driving circuit comprises an oscillator for outputting a predetermined, periodic waveform.

22. The power supply of claim 20, wherein said driving circuit comprises an oscillator for generating a sawtooth ramp waveform of voltage with a fixed period.

23. The power supply of claim 20, wherein said driving circuit comprises an oscillator for outputting a predetermined, periodic waveform, the peak-to-peak voltage output by said oscillator controlled by a voltage supplied to the input port of the switching cell so as to provide feedforward correction of input voltage variation of the switching cell.

24. The power supply of claim 20, wherein said first feedback circuit comprises:

a first resistor coupled between said output port of said summing circuit and a negative terminal of said second differential input pair of said summing comparator;

a second resistor coupled between said negative terminal of said second differential input pair and a ground potential, such that said first and second resistors form a resistor voltage divider; and a noise-filter capacitor coupled between said negative terminal of said second differential input pair and said ground potential, said capacitor chosen so as to not interfere with the low frequency dynamics of the converter.

25. The power supply of claim 20, wherein said first feedback circuit has an output node; and wherein said second feedback circuit comprises:

an error amplifier with a predetermined voltage gain; said error amplifier having a positive input terminal coupled to said reference voltage port and a negative terminal of said second differential input pair of said summing comparator, a negative input terminal coupled to said output node of said first feedback circuit, and an output terminal coupled to a positive terminal of said first differential input pair of said summing comparator; and a capacitor coupled between said negative input terminal of said error amplifier and said positive terminal of said first differential input pair, said capacitor chosen to establish a dominant low frequency pole so as to stabilize said second control loop and so as to provide a unity gain frequency for the second control loop that is substantially below that of said first control loop.

26. The power supply of claim 20, wherein said switching cell comprises a single input and a single output.

27. The power supply of claim 20, wherein said switching cell comprises multiple inputs and multiple outputs.

28. The power supply of claim 20, further comprising:

a current sense element coupled to sense a current in said switching cell and create a voltage proportional to said sensed current, said sense element further coupled to a fourth differential input pair of said summing comparator;

a flip-flop coupled between said summing comparator output terminal and said switching cell control port; and an oscillator coupled to control said driving circuit and said flip-flop so as to provide current mode control.

* * * * *